(12) United States Patent
Khan et al.

(10) Patent No.: US 7,901,005 B2
(45) Date of Patent: Mar. 8, 2011

(54) VEHICLE SEAT

(75) Inventors: Zaki A. Khan, Dublin, OH (US); Michael D. McCannell, Marysville, OH (US); Koji Uno, Tochigi (JP); Patrick Basile, Powell, OH (US)

(73) Assignee: Honda Motor Co., Ltd, Tokyo (JP)

( * ) Notice: Subject to any disclaimer, the term of this patent is extended or adjusted under 35 U.S.C. 154(b) by 330 days.

(21) Appl. No.: 10/663,064

(22) Filed: Sep. 16, 2003

(65) Prior Publication Data

US 2005/0057081 A1 Mar. 17, 2005

(51) Int. Cl.
| | |
|---|---|
| *A47C 1/00* | (2006.01) |
| *A61G 15/00* | (2006.01) |
| *B60N 2/00* | (2006.01) |
| *B60N 2/02* | (2006.01) |

(52) U.S. Cl. .................. 297/331; 297/313; 297/378.1
(58) Field of Classification Search ............... 297/316, 297/320, 331, 378.1, 337, 321, 35, 408, 60, 297/14, 335; 296/65.01, 65.05, 65.08, 65.09, 296/65.18, 65.03, 65.16
See application file for complete search history.

(56) References Cited

U.S. PATENT DOCUMENTS

| | | | | | |
|---|---|---|---|---|---|
| 155,107 | A | * | 9/1874 | Richardson | 297/60 |
| 1,869,365 | A | * | 8/1932 | Corduan | 297/60 |
| 1,963,509 | A | * | 6/1934 | Tinsley | 297/60 |
| 2,088,644 | A | * | 8/1937 | Erpelding et al. | 297/60 |
| 2,257,211 | A | * | 9/1941 | Willoughby | 297/461 |
| 2,418,787 | A | * | 4/1947 | Nelson | 297/34 |
| 2,771,124 | A | * | 11/1956 | Borsani | 297/313 |
| 3,279,850 | A | * | 10/1966 | Buhler et al. | 297/335 |
| 4,779,917 | A | | 10/1988 | Campbell et al. | |
| 4,863,208 | A | | 9/1989 | Streett | |
| 5,489,141 | A | * | 2/1996 | Strausbaugh et al. | 297/335 |
| 5,542,745 | A | * | 8/1996 | Takeda et al. | 297/378.12 |
| 5,671,948 | A | * | 9/1997 | Susko et al. | 280/801.1 |
| 5,707,103 | A | * | 1/1998 | Balk | 297/13 |
| 5,826,942 | A | * | 10/1998 | Sutton et al. | 297/378.12 |
| 5,902,009 | A | | 5/1999 | Singh et al. | |
| 5,957,521 | A | | 9/1999 | Schlachter | |
| 5,984,397 | A | * | 11/1999 | Dawson et al. | 296/65.09 |
| 6,082,802 | A | | 7/2000 | Vigilante, Jr. | |

(Continued)

FOREIGN PATENT DOCUMENTS

JP 61-75028 * 4/1986

(Continued)

*Primary Examiner* — David Dunn
*Assistant Examiner* — Philip Gabler
(74) *Attorney, Agent, or Firm* — Wesly A. Alig; Michael A. Forhan; Eley Law Firm Co.

(57) ABSTRACT

A seat is disclosed for use in a vehicle. The seat includes a pivotable seat cushion, a pivotable seatback, and a pivotable headrest. A rearward portion of the seat cushion is pivotably attached to the floor of the vehicle by an anchor member. A forward portion of the seat cushion is pivotably coupled to a forward support leg that contacts the floor of the vehicle when the seat cushion is retained in a generally horizontal position. The forward support leg automatically retracts to a position proximate the seat cushion when the seat cushion is released and pivoted upwardly to a generally vertical stowed position proximate the seatback. The seatback is pivotably attached to the anchor member and may be downwardly pivoted to a generally horizontal stowed position proximate the seat cushion. The headrest may be pivotally attached to the seatback, and may be movable to a stowed position.

15 Claims, 6 Drawing Sheets

U.S. PATENT DOCUMENTS

| | | | |
|---|---|---|---|
| 6,102,463 A | 8/2000 | Swanson et al. | |
| 6,106,044 A | 8/2000 | Schlachter | |
| 6,161,896 A | 12/2000 | Johnson et al. | |
| 6,179,362 B1 * | 1/2001 | Wisniewski et al. | 296/65.01 |
| 6,231,101 B1 * | 5/2001 | Kamida et al. | 296/63 |
| 6,264,260 B1 | 7/2001 | Kronner et al. | |
| 6,386,612 B2 | 5/2002 | Hofmann et al. | |
| 6,390,547 B1 | 5/2002 | Spykerman | |
| 6,419,313 B1 | 7/2002 | Newman | |
| 6,488,327 B1 | 12/2002 | Pearse et al. | |
| 6,629,729 B2 * | 10/2003 | Wiedeman et al. | 297/232 |
| 6,672,662 B1 * | 1/2004 | Balk | 297/244 |
| 6,742,841 B1 * | 6/2004 | Soditch et al. | 297/335 |
| 7,040,702 B2 | 5/2006 | Yamada et al. | |
| 2004/0032155 A1 * | 2/2004 | Yamada et al. | 297/331 |

FOREIGN PATENT DOCUMENTS

JP    406234337 A    *    8/1994

* cited by examiner

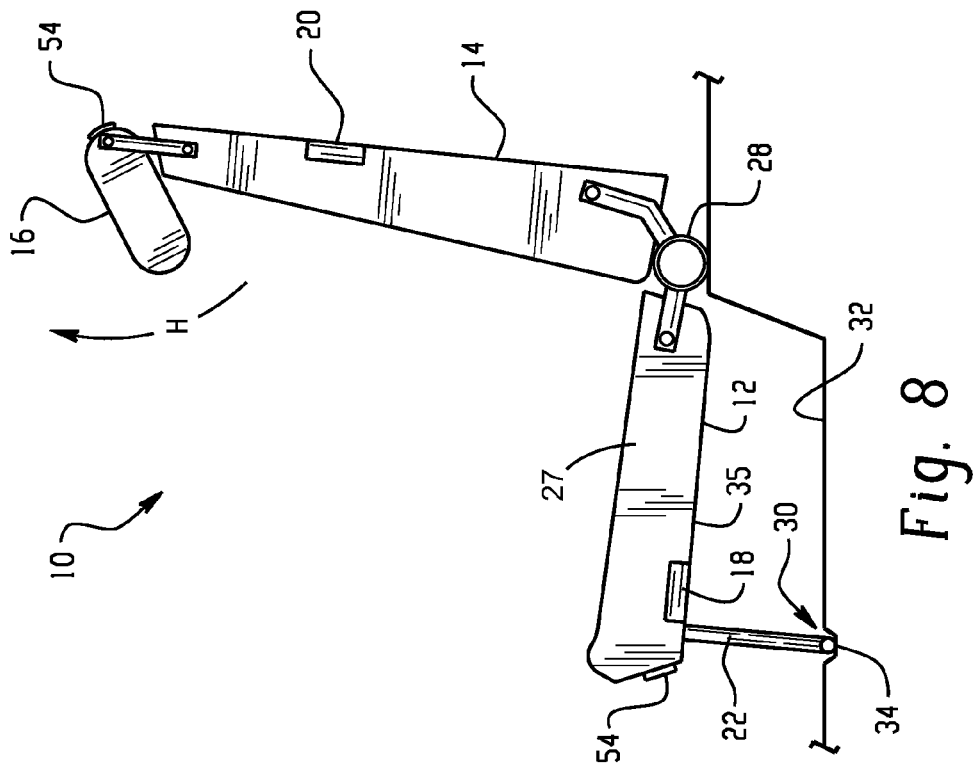
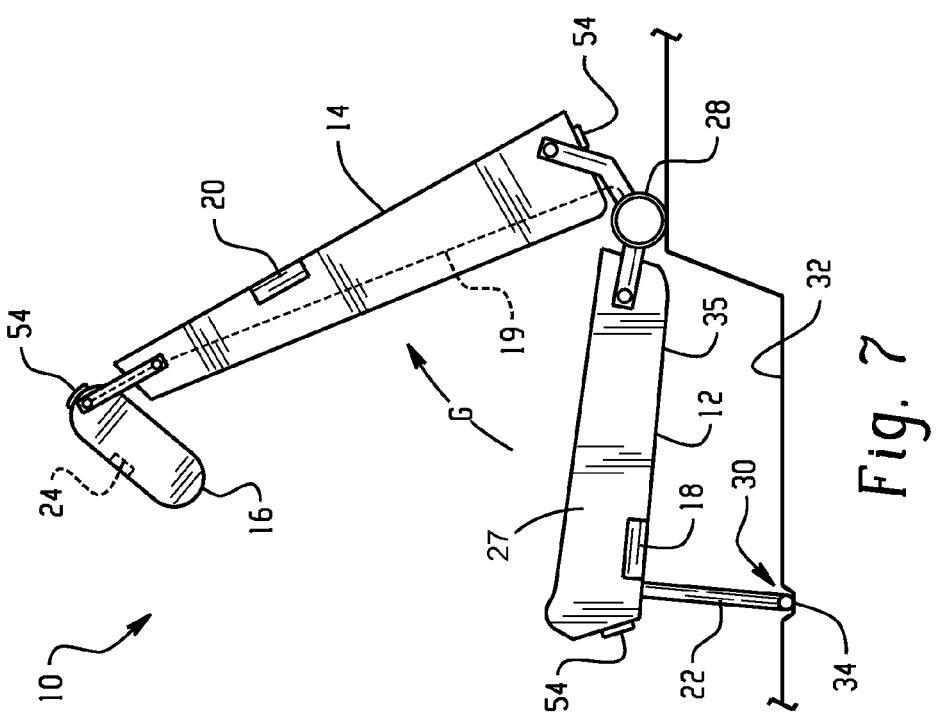
Fig. 8
Fig. 7

VEHICLE SEAT

FIELD

The present invention relates generally to vehicle seats and, more particularly, to such vehicle seats that have stowable seat cushion, seatback and headrest members.

BACKGROUND

Multipurpose vehicles such as vans, minivans, sport utility vehicles and the like typically have a second or even third row of seats that may be installed rearwardly of the driver's and front passenger's seats. The second and third row seats may be selectively removable and replaceable through a large rear or side door in order to reconfigure the vehicle for carrying additional cargo. Removal and replacement of these seats tends to be somewhat cumbersome and requires a considerable amount of effort. In many cases two people may be needed to accomplish removal and replacement. Once the seats are removed, the user is obliged to find a place to safely store them. To overcome these problems and provide additional cargo carrying capacity, many second and third row seats are configurable to be folded from an upright occupiable position to a substantially horizontal load-supporting position, wherein the rear surface of the seatback acts as a load-bearing surface by means of forwardly folding the seatback member over the seat cushion member.

A significant problem that can be encountered during the forward folding of a seatback member over the seat cushion member is that of confronting interference between the headrest of the seatback member and a part of the vehicle's interior structure disposed immediately in front of it, such as other seats. This interference may prevent the seatback from reaching a filly folded position, resulting in an unlevel and/or unstable load-bearing surface. This problem may be exacerbated when the front seats are adjusted rearwardly or are in a reclined position.

Another potential problem with vehicle seat assemblies that fold from an upright occupiable position to a substantially horizontal load supporting position is that there tends to be a gap between adjacent seats. Such gaps permit objects to fall between the seats, or cause portions of the cargo to snag or become caught between them during loading. In addition, such arrangements may not be compatible with heavy cargo that may exceed the load-bearing capacity of the folded seat.

A means to overcome these limitations, while still providing additional cargo space, is to configure the seats such that the seatback is capable of remaining upright while the seat cushion is pivoted upwardly to stow against the seatback in a generally vertical position. This arrangement provides the user with access to a larger portion of the floor of the vehicle and room to load tall cargo, since the cargo space may extend from the floor to the ceiling of the vehicle. However, this configuration presents several challenges. Firstly, the seat cushion must be easily latched and unlatched when changing between the stowed and passenger seating positions. In addition, the seat cushion must be easily pivotable to the stowed position and securely retained in that position until it is returned to the passenger seating position. A particular concern is providing a vehicle seat with a pivotable seat cushion that will provide both the proper support for passenger use and adequately protect passengers in the event of a vehicular collision. An important element of providing such protection is securing the seat sufficiently to withstand certain forces encountered in collisions.

Others have attempted to provide a passenger seat with a moveable seat cushion. An example is the "fold and flip" seat, such as the seat disclosed in U.S. Pat. No. 6,474,739 issued to Lagerweij. However, the fold and flip-type seat requires movement of both the seatback and the seat cushion in order to fold the seat. Further, fold and flip-type seats are typically anchored to the floor of the vehicle such that a set of forward seat cushion anchors are forwardly pivotable to allow the folded seat to be tilted forward, blocking the space forward of the seat.

A particular problem with prior folding seats is providing supports that adequately secure the seat to the vehicle, yet are neither obtrusive nor a present safety hazard when the seat is folded into its stowed position such that the seat's supports are exposed. Prior attempts have been made to overcome this problem with a folding or collapsing support leg, such as disclosed in U.S. Pat. No. 6,394,525 issued to Seibold. However, the rear support as disclosed by Seibold does not provide a workable solution for folding vehicle seats configured with upright seatbacks having pivoting seat cushions.

There is a need for a stowable vehicle seat with an upwardly-pivoting seat cushion that can be easily implemented. There is a further need for a stowable seat cushion that can be pivoted such that the space forward of the seat is not consumed by seat support members. There is a still further need for a stowable vehicle seat having a forward support member that does not create an obstruction or safety hazard when the seat cushion is moved into its stowed position. There is a yet further need for a stowable vehicle seat capable of providing the driver with additional rearward visibility when the headrest of the rear seat is in a stowed position. It is desirable that the stowable headrest include a safety feature whereby the torso line of a rear seat passenger is offset from the stowed headrest such that the seat cannot be comfortably used unless the headrest is extended and providing support to the passenger.

SUMMARY

The present invention overcomes the aforementioned limitations of removable and stowable vehicle seating by providing a seat with an upwardly-pivoting seat cushion having an automatically-retracting forward support leg. When deployed in a passenger seat position, a seat cushion of the vehicle seat is oriented generally horizontally and is generally parallel to the floor of the vehicle. A rearward portion of the seat cushion is pivotally attached and releasably latched to a seat anchor, while a forward portion of the seat cushion is supported by the forward support leg, which contacts a corresponding floor location. When extra cargo space is needed, the seat cushion may be unlatched from the seat anchor and pivoted upwardly such that the seat cushion is stowed in a generally vertical position, proximate the seatback. When the seat cushion is stowed, the forward support leg automatically retracts to a nested position generally flush or close to flush with the bottom of the seat cushion, thereby safely stowing the forward support leg. Conversely, the forward support leg automatically extends to a position generally perpendicular to the seat cushion when the seat cushion is returned to its generally horizontal position.

The present invention further includes a seatback oriented generally vertically and generally perpendicular to the seat cushion. A lower portion of the seatback is pivotally attached and releasably latched to the seat anchor such that the seatback may be stowed in a generally horizontal position proximate the seat cushion. A rear portion of the seatback may serve as a load-bearing surface when the seatback is in the stowed position. An upper portion of the seatback may include a headrest, which may also be releasably pivoted between extended and stowed positions.

BRIEF DESCRIPTION OF THE DRAWINGS

Further features of the inventive embodiments will become apparent to those skilled in the art to which the embodiments relate upon reading the specification and claims with reference to the accompanying drawings, in which:

FIG. 7 is a side elevational view of the vehicle seat of FIG. 1, illustrating the seatback and headrest in a partially unfolded position;

FIG. 8 is a side elevational view of the vehicle seat of FIG. 1, showing the seatback in a fully extended position and the headrest in a stowed position;

DETAILED DESCRIPTION

Figure 1:
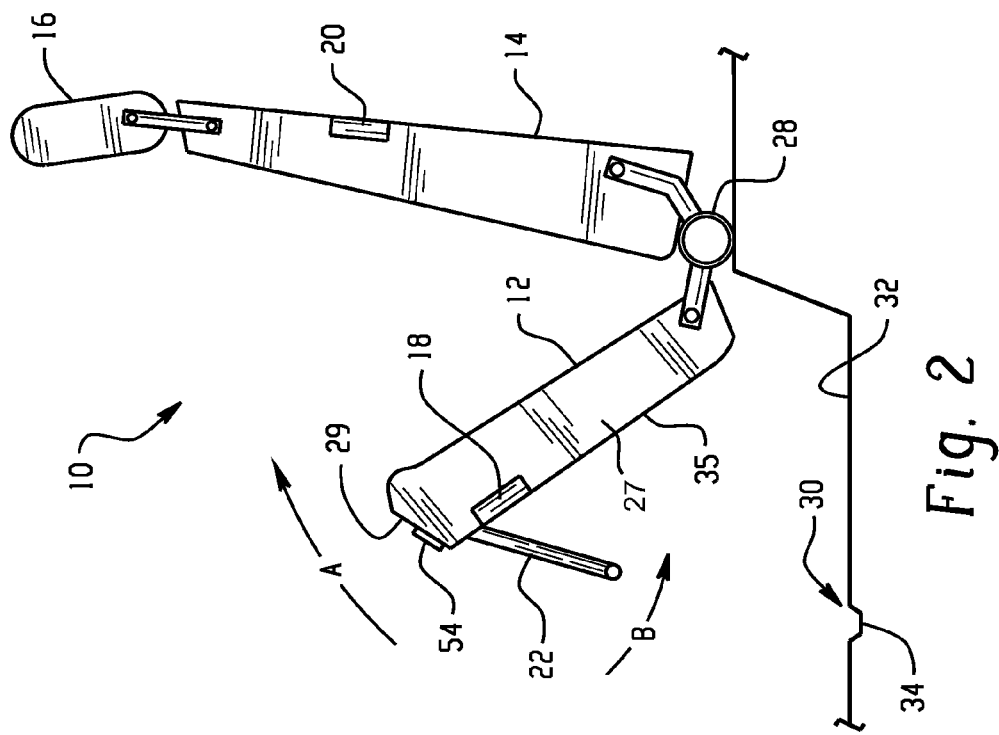
FIG. 1 is a side elevational view of the general arrangement of a vehicle seat according to an embodiment of the present invention.

The general arrangement of a vehicle seat 10 according to a preferred embodiment of the present invention is illustrated in FIG. 1. The vehicle seat 10 includes a seat cushion 12, a seatback 14 and a headrest 16. It should be appreciated that each of these items 12, 14, 16 are comprised of both a structural component, such as an internal frame 48, 50, 52 respectively, and a comfort component, such as covered foam or padding (not shown). Thus, references herein to coupling components to one of these items, such as a seat cushion 12, may involve attachment to the unseen structural component and not directly to the comfort component, e.g., the padding of the seat cushion. Details of the shape, materials and construction of the structural and comfort components are left to the artisan.

With continued reference to FIG. 1, the seat cushion 12 comprises a pair of opposing side portions 27, a forward portion 29, a rearward portion 31, a top portion 33 and a bottom portion 35. The seatback 14 comprises an upper portion 37 and a lower portion 39. A first lever 18 controls release of the seat cushion 12, while a second lever 20 controls release of the seatback 14. A forward support leg 22 extends from a forward portion of the seat cushion 12 to a support contacting portion 30 of a floor 32 of the vehicle. The support contacting portion 30 may optionally include a detent, or "catch" 34. The catch 34 is preferably shaped so as to not present an obstruction to passengers or cargo placed onto the floor 32. For example, the catch 34 may be flush with the floor 32, openly recessed below the floor, or recessed with a biased shield or cover which is movable by engagement of the forward support leg 22 to the catch. At least one anchor member 28 is used to pivotably anchor the rearward portion 31 of the seat cushion 12 to a structural portion of the vehicle, such as the floor 32 or a sidewall. The anchor member 28 includes a seat cushion latch (not shown) linked to the first lever 18 to releasably retain the seat cushion 12 when the seat cushion is to be pivoted. The seat cushion latch may be used to releasably retain the seat cushion 12 in a first, generally horizontal position and in a second, generally vertical position. Likewise, anchor member 28 may include a seatback anchor portion to pivotably anchor the lower portion 39 of the seatback 14 to a structural portion of the vehicle. The anchor member 28 further includes a seatback latch (not shown) linked to the second lever 20 to releasably retain the seatback 14 when the seatback is to be pivoted. The seatback latch may be used to releasably retain the seatback 14 in a first, generally vertical position and in a second, generally horizontal position. Details of the seat cushion and seatback latching mechanisms are left to the artisan, as any conventional type of latch suitable for use with vehicle seats may be used. The seat 10 may be used for passenger seating when configured as shown in FIG. 1, the seat cushion 12 being generally horizontally oriented and the seatback 14 being generally vertically oriented. In addition, the space between the bottom portion 35 of the seat cushion 12 and the floor 32 may be used for underseat storage, if desired.

Figure 2:
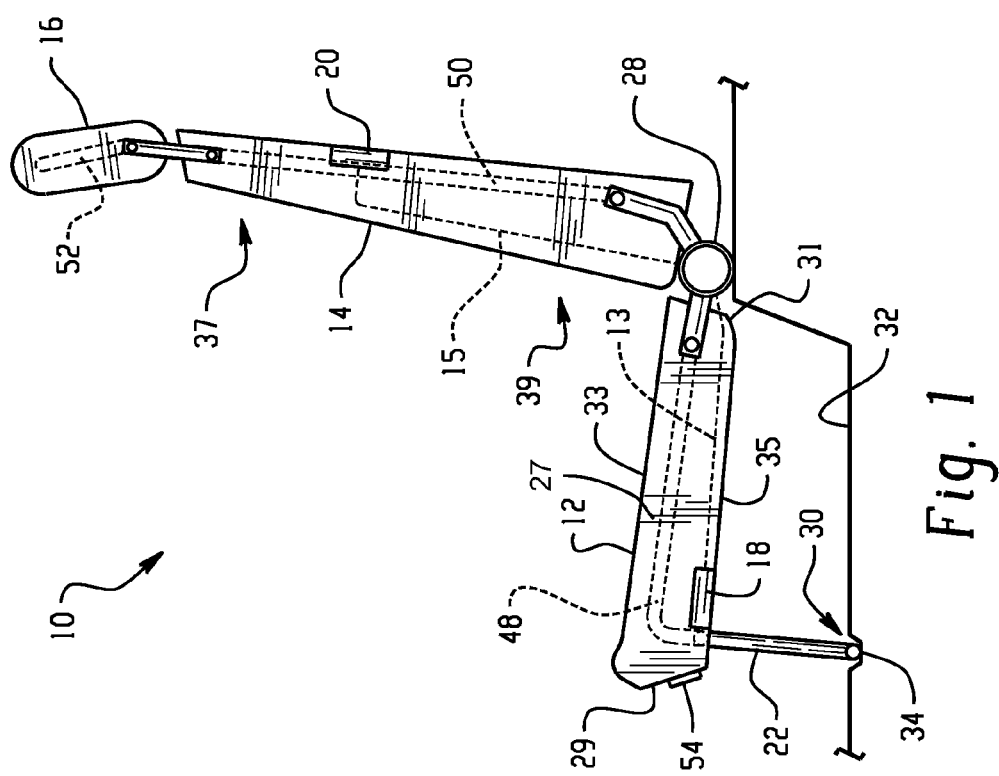
FIG. 2 is a side elevational view of the vehicle seat of FIG. 1, showing the seat cushion in a partially folded position.

The seat cushion 12 may be pivoted to a stowed position, as shown in FIG. 2. The seat cushion 12 is released from its retained, generally horizontal position by actuating the first lever 18, releasing the seat cushion latch portion of anchor member 28. The seat cushion 12 may then be pivoted upwardly, as indicated by arrow "A." As the seat cushion 12 is pivoted upwardly, the forward support leg 22 automatically moves inwardly toward the bottom 35 of the seat cushion, as illustrated by arrow "B." The forward support leg 22 may be retracted by any conventional means, including but not limited to, linkage mechanisms, springs, cables and gearing. Details of the retraction mechanism are left to the artisan.

Figure 3:
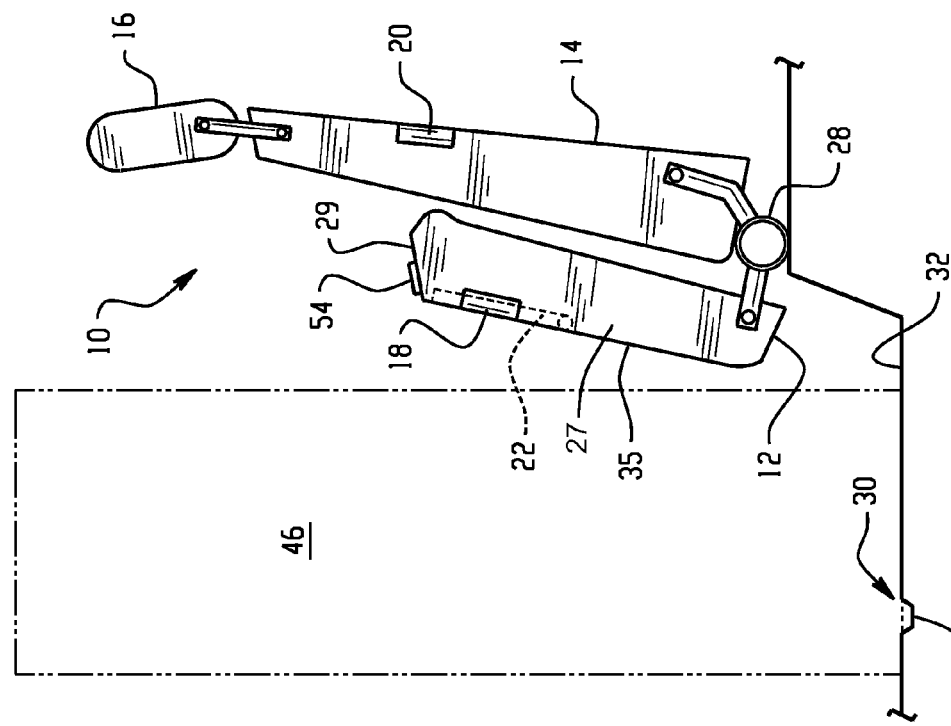
FIG. 3 is a side elevational view of the vehicle seat of FIG. 1, depicting the seat cushion in a fully folded and stowed position.

The seat cushion 12 may be stowed in a generally vertical position proximate the seatback 14, as illustrated in FIG. 3. In the stowed position the forward support leg 22 is retained proximate the bottom 35 of the seat cushion 12, near the forward portion 29. The seat cushion 12 may be retained in the stowed position by any conventional holding means, such as the seat cushion latch portion of anchor member 28, other latches, catches, biasing mechanisms, connectors and fasteners. Details of the seat cushion retaining mechanism are left to the artisan. When the seat cushion 12 is stowed, the space forward of the seat 10 is usable for receiving cargo, illustrated generally in FIG. 3 by reference numeral 46. This cargo space is particularly useful for tall items, such as bicycles and potted plants, as the entire cabin space from the floor 32 to the ceiling (not shown) of the vehicle is available.

Figure 4:
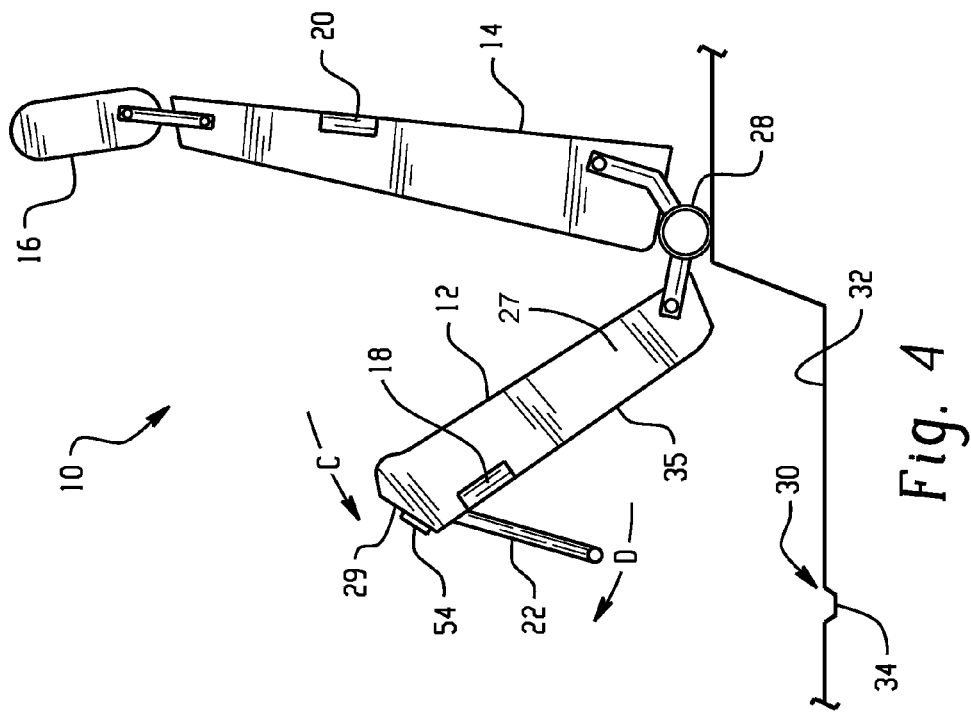
FIG. 4 is a side elevational view of the vehicle seat of FIG. 1, illustrating the seat cushion in a partially unfolded position.

The seat cushion 12 may be returned to an extended position by actuating the first lever 18 to release the seat cushion from its stowed position, then pivoting the seat cushion downwardly, as indicated by arrow "C" in FIG. 4. As the seat cushion 12 moves downwardly, the forward support leg 22 moves outwardly and away from the bottom 35 of the seat cushion, as indicated by arrow "D." When the seat cushion 12 is moved to a fully extended position, the forward support leg 22 contacts the support contacting portion 30 located on the floor 32 of the vehicle such that the forward support leg provides structural support to the seat cushion 12 (see FIG. 1).

In addition, the seat cushion latch portion of anchor member 28 engages to retain the seat cushion 12 in a generally horizontal orientation.

Figure 5:
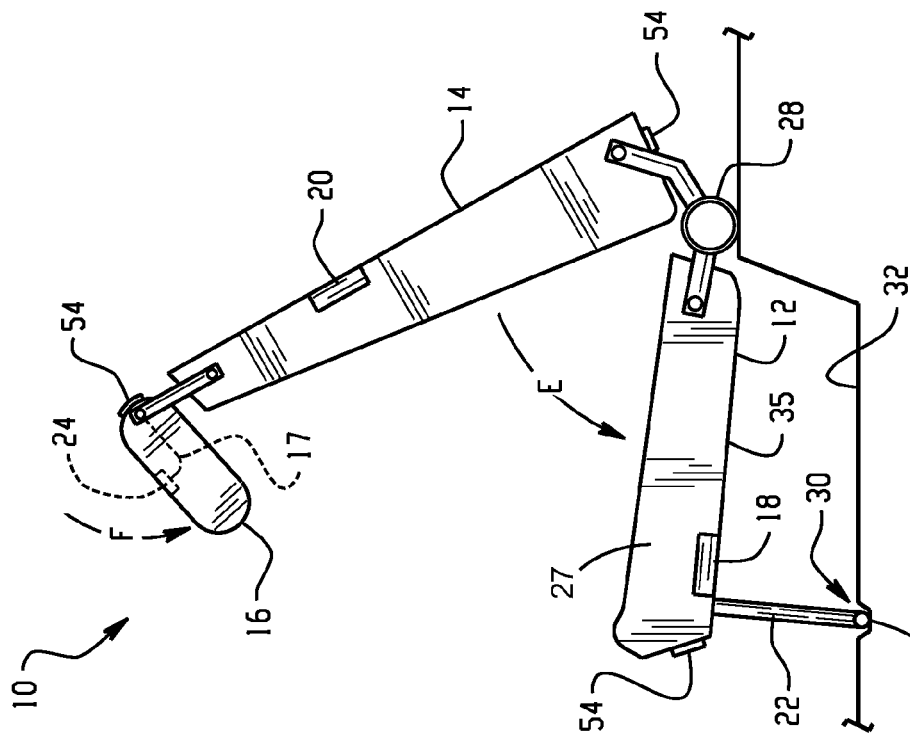
FIG. 5 is a side elevational view of the vehicle seat of FIG. 1, showing the seatback and headrest in a partially folded position.

The seatback 14 of the seat 10 may also be folded if desired, as depicted in FIG. 5. The seatback 14 is released from its retained, generally vertical position by actuating the second lever 20 to release the seatback latch portion of anchor member 28. The seatback 14 may then be pivoted downwardly, as indicated by arrow "E" in FIG. 5.

The headrest 16 is attached to the upper portion 37 of seatback 14. When the seatback 14 is released, the headrest 16 may also be released and pivoted downwardly to a stowed position as indicated by arrow "F" in FIG. 5, by actuating a third lever 24 to release a headrest latch 17. The headrest latch may be used to releaseably retain the headrest 16 in a first extended position generally aligned with the seatback 14, and in a second stowed position generally perpendicular to the seatback. The headrest latch may be any convenient type of latching mechanism adapted to releaseably retain the headrest 16. Details of the latching mechanism are left to the artisan. The headrest 16 may optionally be biased to pivot to the stowed position when the third lever 24 is actuated. In another embodiment of the present invention, the headrest 16 may include a linkage 19 (see FIG. 7) to the seatback 14 in any conventional manner such that the headrest is automatically pivoted to a stowed position when the seatback is pivoted to the stowed position. Likewise, the headrest 16 may be adapted to automatically pivot to the extended position when the seatback 14 is moved to the upright position. In still another embodiment of the present invention, the headrest 16 may be vertically adjustable to accommodate passengers of varying height, or may be removable. In yet another alternate embodiment of the present invention, the headrest 16 may be shaped and/or positioned so as to prevent a passenger from comfortably occupying the seat 10 when the headrest is not in an extended position. This ensures that the headrest 16 is in a position to provide the passenger with support and protection.

Figure 6:
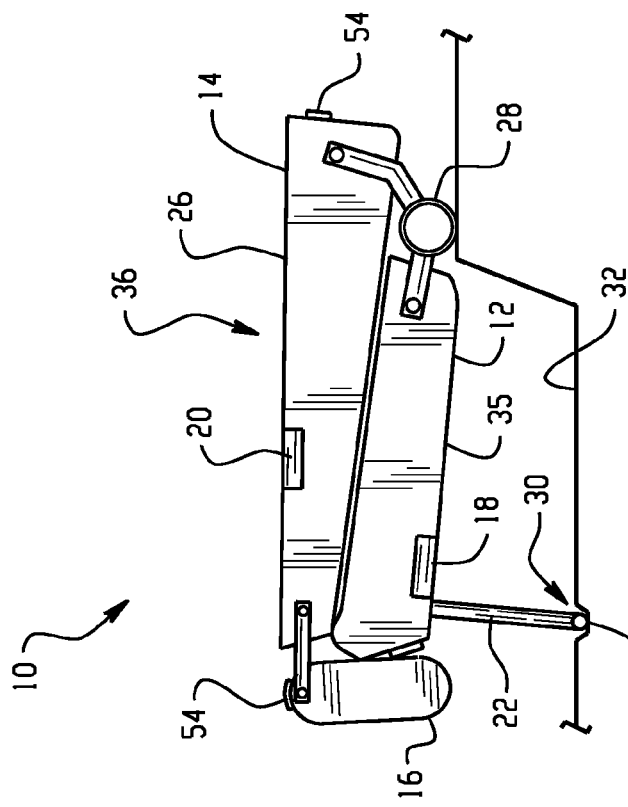
FIG. 6 is a side elevational view of the vehicle seat of FIG. 1, depicting the seatback and headrest in a fully folded and stowed position.

In the fully stowed position the seatback 14 is oriented generally horizontally, proximate the seat cushion 12, as shown in FIG. 6. The headrest 16 may be stowed proximate a forward portion of the seat cushion 12. A rear side 26 of the seatback 14 may be used as a load-bearing surface 36 in this configuration. The load-bearing surface 36 is preferably at a convenient height in the vehicle to facilitate loading and unloading of cargo. In addition, the load-bearing surface 36 may optionally be oriented at an angle in relation to the floor 32, such as at about a 4° angle.

The seatback 14 may be returned to an upright position by pivoting the seatback upwardly, as indicated by arrow "G" in FIG. 7. When the seatback 14 is returned to the upright position the headrest 16 may optionally remain in a stowed position, as indicated in FIG. 8, to provide the driver with additional rearward visibility. Alternatively, the headrest 16 may be returned to an upright position by pivoting the headrest upwardly, as indicated by arrow "H" in FIG. 8, until the headrest is retained in a generally vertical extended position (see FIG. 1) by the headrest latch. In an alternate embodiment of the present invention, the headrest 16 may be linked to the seatback 14 as previously described, such that the headrest is automatically pivoted to an extended position when the seatback is returned to an upright position.

Figure 9:
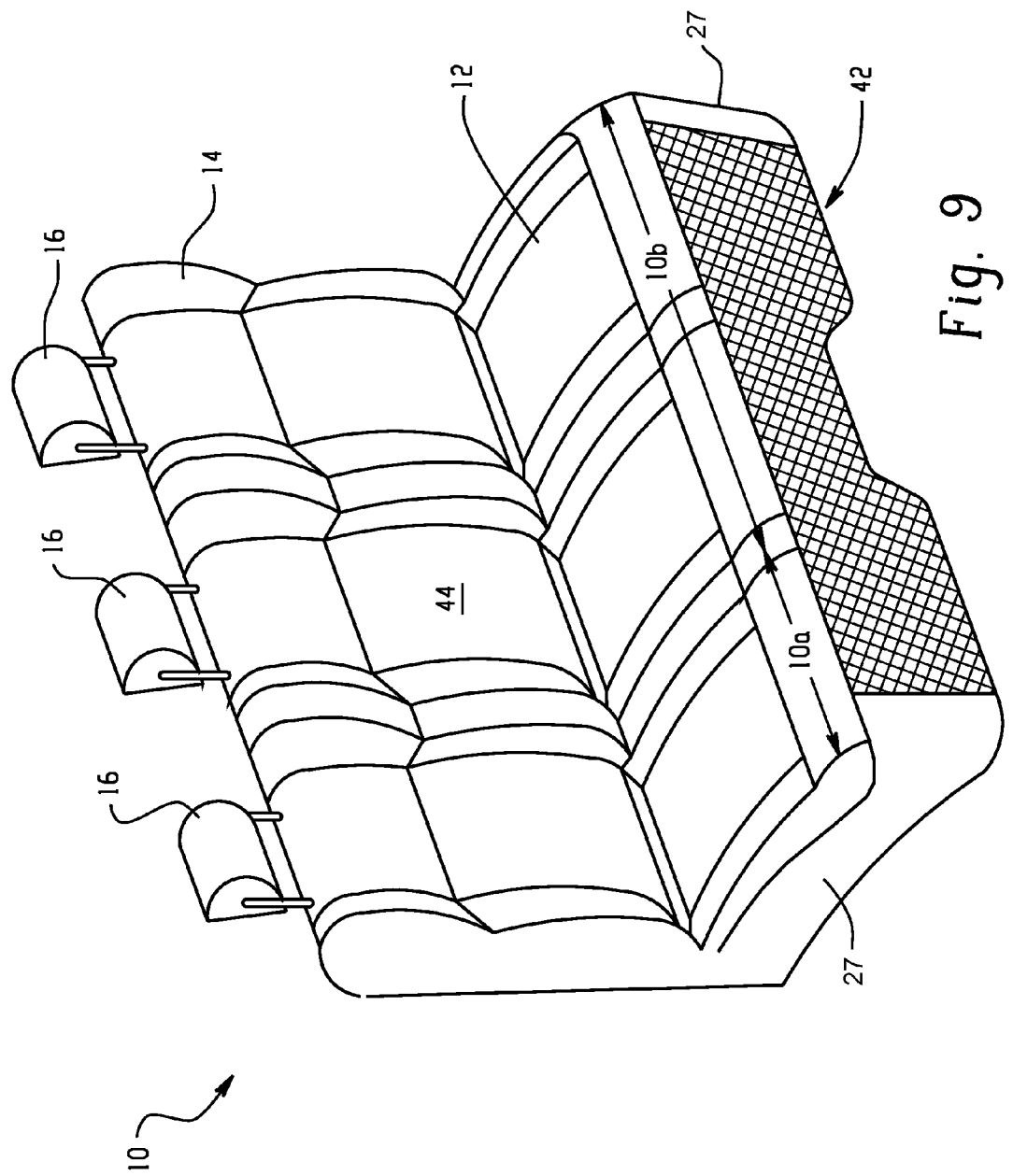
FIG. 9 is a perspective view of a vehicle seat according to an embodiment of the present invention, depicting a cargo retainer and an armrest.

The seat 10 may be adapted to accommodate one passenger, such as a "captain's chair," or may be a bench-type seat adapted to accommodate two or more passengers. If configured as a bench seat, as depicted in FIG. 9, the seat 10 may include a plurality of headrests 16 for the passengers. The seat 10 may further be divided into two or more stowable segments such as segments 10a and 10b, allowing portions of the seat to be stowed for cargo carriage while other portions of the seat may be used for passenger seating. The width of seat 10 may be divided into equal halves, or into unequal segments wherein a first segment comprises one third of the width of the seat (such as segment 10a) and a second segment comprises two thirds of the width of the seat (such as segment 10b). The seat 10 may optionally include convenience features, such as a fold-out center armrest 44 and cup holders (not shown). The seat is further adapted to accommodate safety belts (not shown) for all passengers. The safety belts may comprise both seat belts and shoulder harnesses.

In another embodiment of the present invention, the seat 10 may include a cargo retainer 42, as depicted in FIG. 9. The cargo retainer may be located under the forward portion of the seat cushion 12, effective to prevent cargo stored under the seat 10 from sliding out from under the seat during a sudden deceleration of the vehicle. The cargo retainer 42 may be rigid or may be flexible, such as a mesh or screen, and may be manually engaged or may stow and extend automatically by any conventional means when the seat cushion 12 is moved between the stowed and seating positions.

Figure 10:
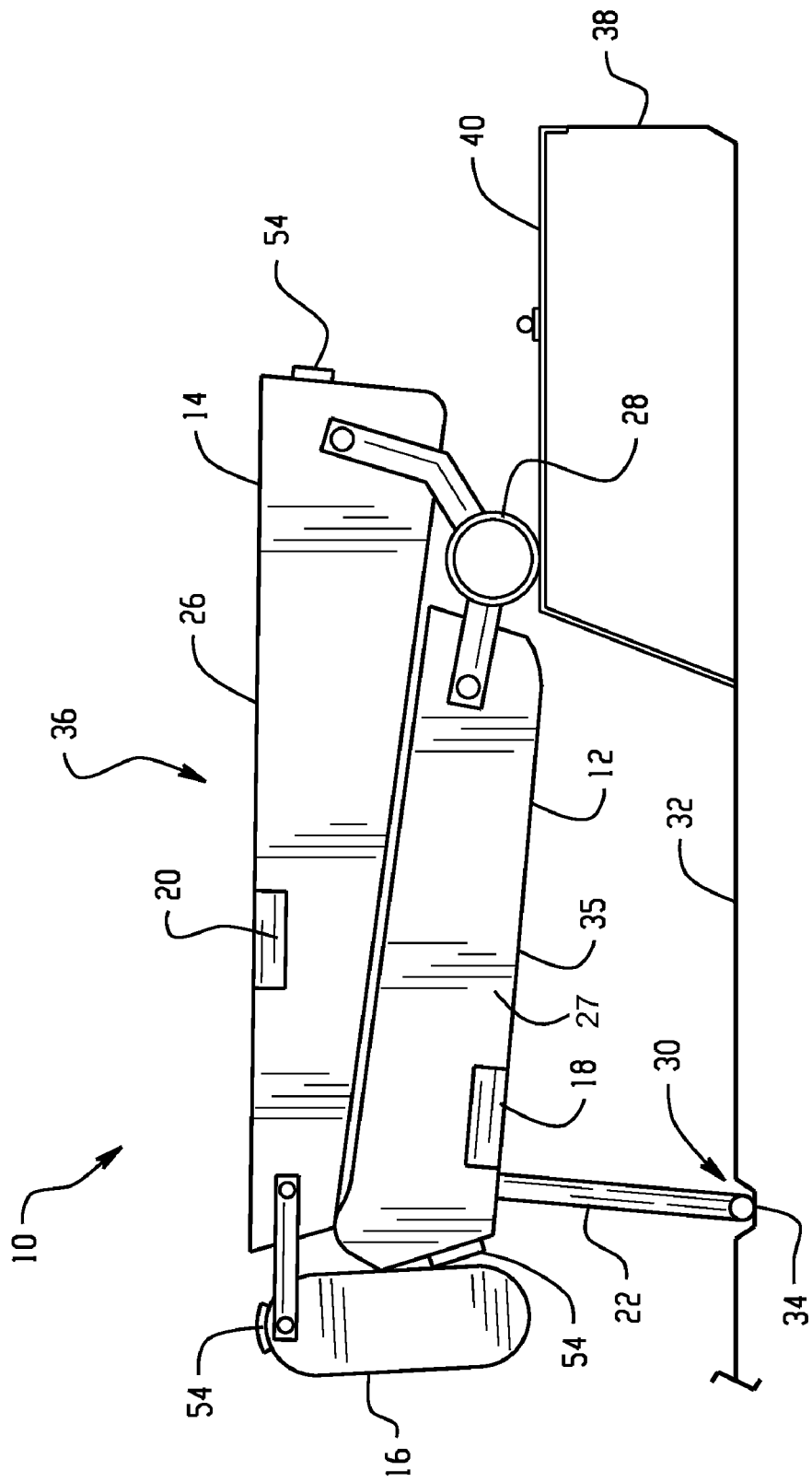
FIG. 10 is a side elevational view of a vehicle seat according to an embodiment of the present invention, showing an optional storage container.

In still another embodiment of the present invention, a storage container 38 may be positioned aft of the seat cushion 12 and below the load-bearing surface 36, as shown in FIG. 10. The storage container 38 may be adapted to hold vehicle accessories, such as tire-changing tools and booster cables, and may include a closure, such as a snap-on, slidable or hinged cover 40. The seat cushion 12 and seatback 14 are adapted to pivot between their respective extended positions and stowed positions without interference from the storage container 38.

In yet another embodiment of the present invention, at least one visual indicator 54 may be made part of each of the first, second and third latching mechanisms as a safety enhancement. The indicators are preferably mechanical and provide visual indications to the user when each of the first, second and third latches are not in a retained condition. In an example embodiment, portions of the seat cushion 12, seatback 14 and headrest 16 may be exposed only when unlatched. The exposed portions may include advisory or warning legends and/or attention-getting colors.

While this invention has been shown and described with respect to several detailed embodiments thereof, it will be understood by those skilled in the art that various changes in form and detail thereof may be made without departing from the scope of the claims of the invention.

What is claimed is:

1. A foldable seat, comprising:
   a common and stationary anchor member connected to a structural portion of a vehicle, the anchor member stationarily housing a first and a second pivot axis, the second pivot axis being elevated with respect to the first pivot axis, the second pivot axis further being spaced apart from and parallel to the first pivot axis;
   a seat cushion having an enclosure defined by a pair of opposing side portions, a forward portion extending between the side portions, a rearward portion opposing the forward portion and extending between the side portions, and a top portion coupled to the side, forward and rearward portions, the seat cushion further including a bottom portion, the rearward portion of the seat cushion being pivotably coupled to the anchor member, the seat cushion being pivotable on the first pivot axis about the anchor member;
   a seatback comprising an upper portion and a lower portion, the lower portion of the seatback being pivotably coupled to the anchor member in common with the seat cushion, the seatback being pivotable on the second pivot axis about the anchor member; and a forward support leg pivotably coupled to the bottom portion of the seat cushion proximate the forward portion, the forward support leg being movable between a stowed position generally parallel with the bottom portion of the seat cushion and within the enclosure, and an extended position generally perpendicular to the seat cushion and engaging the structural portion, the forward support leg being pivotable on a third pivot axis, the third pivot axis being spaced apart from and parallel to both the first pivot axis and the second pivot axis, the top portion of the seat cushion being pivotable to a position facially adjacent the seatback and the seatback being pivotable to a position facially adjacent the top portion of the seat cushion, the seat cushion being independently pivotable about the anchor member with the seatback stationary and the seatback being independently pivotable about the anchor member with the seat cushion stationary, and the forward support leg automatically retracting into the stowed position when the seat cushion is pivoted upwardly, and automatically extending into the extended position when the seat cushion is pivoted downwardly.

2. The seat of claim 1 wherein the seat cushion is upwardly pivotable to a generally vertical position proximate and facially adjacent the seatback.

3. The seat of claim 1 wherein the seatback is downwardly pivotable to a generally horizontal position proximate and facially adjacent the seat cushion to overlay the seat cushion.

4. The seat of claim 1, further comprising a headrest coupled to the upper portion of the seatback.

5. The seat of claim 4 wherein the headrest is releaseably retained in at least one position by a third latch, and wherein the third latch may be actuated by a third lever to release the third latch, allowing the headrest to be pivoted.

6. The seat of claim 5 wherein the headrest is releaseably retained in either a first extended position generally aligned with the seatback or a second stowed position generally perpendicular to the seatback.

7. The seat of claim 4 wherein the headrest is linked to the seatback such that the headrest pivotably advances toward a stowed position as the seatback is downwardly pivoted, and wherein the headrest pivotably advances toward an extended position as the seatback is upwardly pivoted.

8. The seat of claim 4 wherein the headrest is biased toward a stowed position and releasably retained in an extended position.

9. The seat of claim 4 wherein at least one passenger is deterred from utilizing the seat when the headrest is not in an extended position.

10. The seat of claim 1 wherein the seat cushion is releaseably retained in at least one position by a first latch, and wherein the first latch may be actuated by a first lever to release the first latch when the seat cushion is to be pivoted.

11. The seat of claim 10 wherein the seat cushion is releaseably retained either in a first generally horizontal position or a second generally vertical position.

12. The seat of claim 1 wherein the seatback is releaseably retained in at least one position by a second latch, and wherein the second latch may be actuated by a second lever to release the second latch when the seatback is to be pivoted.

13. The seat of claim 12 wherein the seatback is releaseably retained in either a first generally vertical position or a second generally horizontal position.

14. The seat of claim 1 wherein at least one of the seat cushion and seatback provide a visual indication when not in a retained condition.

15. A foldable seat anchorable to a structural portion of a vehicle, comprising:

a common and stationary anchor member connected to the structural portion, the anchor member stationarily housing a first and a second pivot axis, the second pivot axis being elevated with respect to the first pivot axis, the second pivot axis further being spaced apart from and parallel to the first pivot axis;

a seat cushion having an enclosure defined by a pair of opposing side portions, a forward portion extending between the side portions, a rearward portion opposing the forward portion and extending between the side portions, and a top portion coupled to the side, forward and rearward portions, the seat cushion further including a bottom portion, the rearward portion of the seat cushion being pivotably coupled to the anchor member, the seat cushion being pivotable on the first pivot axis about the anchor member, wherein the seat cushion is releasably retained in either a first generally horizontal position or a second generally vertical position by a latch, and wherein the latch may be actuated by a lever to release the latch to allow the seat cushion to be pivoted about the rearward portion;

a seatback comprising an upper portion and a lower portion, the lower portion of the seatback being pivotably coupled to the anchor member in common with the seat cushion, the seatback being pivotable on the second pivot axis about the anchor member; and a forward support leg pivotably coupled to the bottom portion of the seat cushion proximate the forward portion, the forward support leg being movable between a stowed position generally parallel with the bottom portion of the seat cushion and within the enclosure, and an extended position generally perpendicular to the seat cushion and engaging the structural portion, the forward support leg being pivotable on a third pivot axis, the third pivot axis being spaced apart from and parallel to both the first pivot axis and the second pivot axis, the top portion of the seat cushion being pivotable to a position facially adjacent the seatback and the seatback being pivotable to a position facially adjacent the top portion of the seat cushion, the seat cushion being independently pivotable about the anchor member with the seatback stationary and the seatback being independently pivotable about the anchor member with the seat cushion stationary, and the forward support leg automatically retracting into the stowed position when the seat cushion is pivoted upwardly, and automatically extending into the extended position when the seat cushion is pivoted downwardly.

\* \* \* \* \*